United States Patent
Matsumura et al.

(10) Patent No.: US 6,926,831 B2
(45) Date of Patent: Aug. 9, 2005

(54) METHOD FOR DIRECT CLARIFICATION OF GROUNDWATER POLLUTED WITH NITRATE

(75) Inventors: Masatoshi Matsumura, Ibaraki (JP); Rey Nayve Fidel, Naga (PH)

(73) Assignee: Japan Science and Technology Corporation, Saitama (JP)

( * ) Notice: Subject to any disclaimer, the term of this patent is extended or adjusted under 35 U.S.C. 154(b) by 106 days.

(21) Appl. No.: 10/239,419

(22) PCT Filed: Mar. 23, 2001

(86) PCT No.: PCT/JP01/02362
§ 371 (c)(1),
(2), (4) Date: Dec. 6, 2002

(87) PCT Pub. No.: WO01/70637
PCT Pub. Date: Sep. 27, 2001

(65) Prior Publication Data
US 2004/0084376 A1 May 6, 2004

(30) Foreign Application Priority Data
Mar. 24, 2000 (JP) ........................................ 2000-085416

(51) Int. Cl.[7] .................................................. C02F 3/00
(52) U.S. Cl. ......................... 210/615; 210/660; 210/691
(58) Field of Search ................................. 210/615, 660, 210/691

(56) References Cited

FOREIGN PATENT DOCUMENTS

| DE | 2607114 | | 9/1976 |
|----|---------|---|--------|
| JP | 04135481 A | * | 5/1992 |
| JP | 6-31296 | | 2/1994 |
| JP | 8-267081 | | 10/1996 |
| JP | 8-323381 | | 12/1996 |
| JP | 10-85782 | | 4/1998 |
| JP | 10-165733 | | 6/1998 |
| JP | 11-90471 | | 4/1999 |

* cited by examiner

Primary Examiner—Robert A. Hopkins
(74) Attorney, Agent, or Firm—Wenderoth, Lind & Ponack, L.L.P.

(57) ABSTRACT

In order to provide a safe means for the direct purification of groundwater, which enables the efficient use of carbon source and the concentration of nitrificans, while requiring no addition of heavy metals, a starch-derived biodegradable plastic is used as a single carbon source and immobilizing carrier of denitrificans, and contacted with nitrate-polluted groundwater.

14 Claims, 2 Drawing Sheets

METHOD FOR DIRECT CLARIFICATION OF GROUNDWATER POLLUTED WITH NITRATE

TECHNICAL FIELD

The invention of the present application relates to a method and an apparatus for the direct purification of nitrate-polluted groundwater. More specifically, the invention of the present application relates to an efficient, safe and inexpensive method for the direct purification of groundwater for drinking and irrigation use, polluted with nitrate nitrogen.

BACKGROUND ART

Because biological denitrification essentially requires a carbon source that acts as an electron donor, in conventional methods for direct purification of nitrate-polluted groundwater, i.e. groundwater polluted with nitrogen in the form of nitrates, denitrificans and water-soluble carbon sources were charged into groundwater separately. However, in such conventional methods, diffusion of the denitrificans and the water-soluble carbon sources in to the vein occur, and sufficient effect could not be generated.

Further, for the purpose of providing drinking water, the use of toxic carbon sources such as methanol had to be avoided and the carbon source that could be used for denitrification were limited.

Furthermore, since most enzymes involved in the denitrification metabolism are metal enzymes, the addition of a small amount of heavy metals such as Fe, Mo, Mn or Cu has been considered necessary for the denitrificans to sustain high activity. However, there is a problem in that the metal content of groundwater varies and water with high metal content is not suitable for drinking.

Hence, the object of the present invention is to overcome the above-described problems of the prior art and to provide a novel safe purification method that enables the efficient use of carbon sources and the concentration of denitrificans, and does not require the addition of heavy metals, as well as an apparatus for such method.

DISCLOSURE OF THE INVENTION

In order to solve the above-described problems, the invention of the present application provides, firstly a method for direct purification of nitrate-polluted groundwater, which comprises contacting nitrate-polluted groundwater with a carrier to which denitrificans are immobilized, wherein the carrier consists of a starch-derived biodegradable plastic that acts as a single carbon source for the denitrificans.

Further, the invention of the present application provides, secondly, the method for direct purification of nitrate-polluted groundwater, wherein the starch-derived biodegradable plastic contains 60 wt % or more of starch; thirdly, the method for direct purification of nitrate-polluted groundwater, wherein the starch-derived biodegradable plastic is porous; fourthly, the method for direct purification of nitrate-polluted groundwater, wherein the starch-derived biodegradable plastic has a porosity of 10% or more.

Furthermore, the invention of the present application provides, fifthly, the method for direct purification of nitrate-polluted groundwater, wherein the starch-derived biodegradable plastic has a low solubility to water, and sixthly, the method for direct purification of nitrate-polluted groundwater, wherein the starch-derived biodegradable plastic is recycled from waste.

Seventhly, the invention of the present application provides the method for direct purification of nitrate-polluted groundwater, wherein the denitrificans do not require heavy metals or accumulate nitrous acid, and show denitrification effect at low temperatures of 20° C. or lower.

Further, the invention of the present application provides, eighthly, the method for direct purification of nitrate-polluted groundwater, wherein contacting with water occurs by installing the carrier in a net case, and shaking the case vertically; ninthly, the present invention also provides an apparatus for direct purification of nitrate-polluted groundwater by the above method, which comprises a net case for installing the carrier and a means for shaking the case vertically while in contact with groundwater.

BEST MODE FOR CARRYING OUT THE INVENTION

Figure 1:
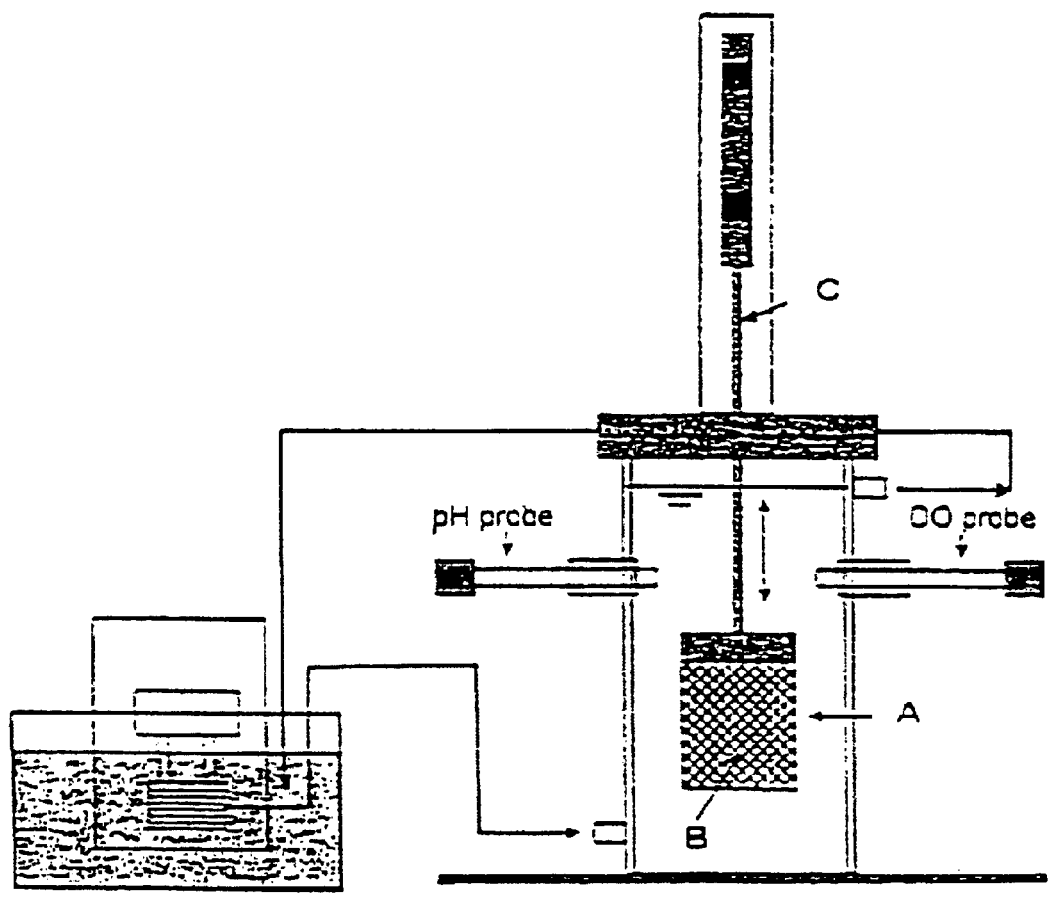
FIG. 1 is a schematic view that shows an example of the structure of the apparatus of the present invention.

The present invention has the above-described feature; hereinafter, embodiments are described in further detail.

Among the various features of the present invention, the present method for direct purification of nitrate-polluted groundwater is characteristic in that denitrificans that grow using starch as its single carbon source are immobilized on an inexpensive biodegradable plastic derived from starch.

In the present method for direct purification, since the denitrificans exist along with the carbon source, the carbon source can be used efficiently and the denitrificans can be concentrated. Further, as a carbon source, there is no concern for the toxicity of starch as in the case of methanol, and because various microorganisms use the same as a carbon source, it is advantageous for the separation of useful denitrificans.

As the starch-derived biodegradable plastics, those with a starch content of 60% by weight or more, for example, of about 70% by weight, which show low solubility in water, and are porous are preferable. Such characteristics are important in order to immobilize many denitrificans and to enable treatment for a relatively long period of time.

The starch-derived biodegradable plastics may preferably show physical properties such as a specific gravity of 1.01 to 1.05, easy formation of a suspension, and a porosity of 10 to 60%. Further, the raw material for starch may include various materials such as potato, sweet potato, wheat and corn. Also, graft polymers of starch obtained using reactive monomers with unsaturated bonds such as methyl acrylate may be used in the present invention.

The biodegradable plastics derived from starch used in the present invention include various materials such as composites or copolymers of starch and lactate polymer, starch crosslinked (polymerized) with cyclodextrin or the like, and molded materials from complex of starch with various natural polymers. However, since this material is used not only as a carrier for immobilizing bacteria but also as a single carbon source, the ratio of the starch or starch block in the biodegradable plastic is preferably 60 wt % or more. Further, to immobilize a larger number of bacteria and increase the area of contact with water, the biodegradable plastics are preferably porous, more preferably, with a porosity of 10% or more, or even more preferably, about 15 to 45%.

Further, as the starch-derived biodegradable plastics, disposable materials presently used as, for example, packing materials, i.e. recycled products from waste, may be used. In this case, the method for direct purification of the present invention becomes extremely economic. It also becomes meaningful in that waste can be effectively reused.

In the method of the present invention, wherein the above-described biodegradable plastics are used as a carrier, the denitrificans are immobilized on this carrier. The bacteria can be immobilized by merely charging a dry carrier to a suspension of bacteria, whereby the bacteria are aspirated into the pores of the carrier and easily immobilized thereto. The denitrificans in this case can be selected from various types of denitrificans belonging to, for example, *Pseudomonas, Janthinobacterium, Zoogloe, Alkaligenes, Nitrobacter, Nitrosomonas* and *Klebsiella*. Specifically, denitrificans such as *Pseudomonas aeruginosa, Pseudomonas stutzeri, Pseudomonas mephitica, Janthinobacterium lividum, Zoogloea* sp., *Alcaligenes denitrificans* and *Paracoccus denitrificans* may be exemplified. Preferably, bacteria that exhibit denitrification activity without the addition of heavy metals are used. Further, since the temperature of well water is about 15° C., bacteria that grow and show denitrification activity at temperatures of 20° C. or lower are preferred in general.

For the selection of the denitrificans, as described in the following Examples, bacteria that generate gas when transplanted to a Giltay-Starch medium may be determined as those showing denitrification activities. Further, the effect of heavy metals can also be determined easily.

To perform direct purification by charging the bacteria immobilized on a biodegradable plastic derived from starch into subterranean vein without causing secondary pollution according to the method of the present invention, and to obtain sufficient results, it is desirable to charge a considerably large amount of immobilized bacteria. Accordingly, the invention also provides an apparatus for the purification of nitrate-polluted groundwater in a well.

In such an apparatus, because a large amount of nitrogen gas is emitted from the active denitrificans and deposited on the carrier, the carrier is likely to float, leading to the decrease in the area of contact between carrier and water; in such a situation, a decrease in the denitrification efficiency can be expected. Accordingly, in the apparatus of the present invention, the carrier, which has little physical strength and is fragile, should be dispersed into water in a narrow well without crushing, to avoid the occurrence of such problems. For this purpose, as shown in FIG. 1, in a cylindrical net cage (A) is placed the immobilizing carrier (B) with a volume of about 60 to 70% the volume of the cage, and moved vertically by a vertical-shaking means such as an air cylinder (C). Here, the movement may be controlled so that, for example, the descent is relatively slow, while the ascent is rapid. By such movement of the cage, the carrier within the cage floats due to its buoyancy in water and its contact with water may be sustained. Since the carrier is consumed along with progress of denitrification and supplementing is required, the cage that contains the carrier is preferably of a cartridge type. Further, upon exchange, the carrier in the old cartridge may be mixed into the new cartridge. By such operation, the denitrificans deposited on the old carrier can transfer to the new carrier and resume nitrification activity.

Hereinafter, the method of the present invention is described in more detail with reference to the following Examples. It should be apparent that the invention is not limited in any way by the following Examples.

EXAMPLES

<Denitrificans 1>

Strains of denitrificans were separated from subsoil of lakes and ponds. The source of the bacteria was the subsoil of Lake Senba, Mito-City. The separation method is as follows:

That is, a sufficiently diluted liquid suspension of subsoil was smeared on an agar plate, and cultured at 4° C. for 3 to 4 weeks; the generated colonies were transplanted to separate agar plates (containing peptone and yeast extract) with soluble starch added, and cultured at 4° C. for 3 to 4 weeks. The decomposition of starch by the generated colonies was confirmed by observing that no blue-black color was developed at the periphery of the colonies upon injection of an iodine-potassium iodide solution on the plate. The colony confirmed to show high decomposition ability of starch was once again transplanted to a starch-containing agar medium without peptone and yeast extracts; growth was observed in this minimum medium that contained little nutrients, wherein starch was the single carbon source.

The absence or presence of denitrification activity was studied for the 25 strains that passed the above test. The colonies were transplanted to a test tube containing 20 ml of Giltay-Starch medium and cultured for ten days. The colonies for which the color of the medium changed from green to blue and gas generation was observed, were determined as those with denitrification activity, and strains that showed high denitrification abilities were acquired.

The separated strains were analyzed by 16SrRNA, and confirmed as *Zoogloea* sp. based on BLAST Search Data in high homology (98.12%).

Further, the strain transformed nitric acid at a high concentration of 350 ppm into nitrogen without the addition of heavy metals, at a low temperature of 15° C., and no accumulation of nitrous acid was observed. Further, the strain was also characteristic in that the denitrification ability was inhibited by the addition of heavy metals, and at a temperature of 30° C.

<Denitrificans 2>

By the method described for denitrificans 1, denitrificans that show high denitrification activity at a temperature of 20° C. or lower and does not accumulate nitrous acid or require heavy metals were selected as *Pseudomonas mephitica* from the *Pseudomonas* genus.

<Denitrificans 3>

*Janthinobacterium lividum* was separated from the *Janthinobacterium* genus as denitrificans by the method described for denitrificans 2.

<Direct Purification>

Denitrification was performed in a simulated well created in a laboratory, using an apparatus for which the structure is shown in FIG. 1.

The volume of the stainless steel basket (A) was 20% of the reactor. Carrier (B) on which the above-described bacteria were immobilized was placed in the basket (A).

As the carrier and the carbon source, wasted starch-derived porous biodegradable plastic (starch content 72 wt %) used as packing material were recycled.

The material had a specific gravity of 1.03 and a porosity of 20%. The bacteria were immobilized to the carrier by charging the carrier into suspensions of the above-described bacteria.

Figure 2:
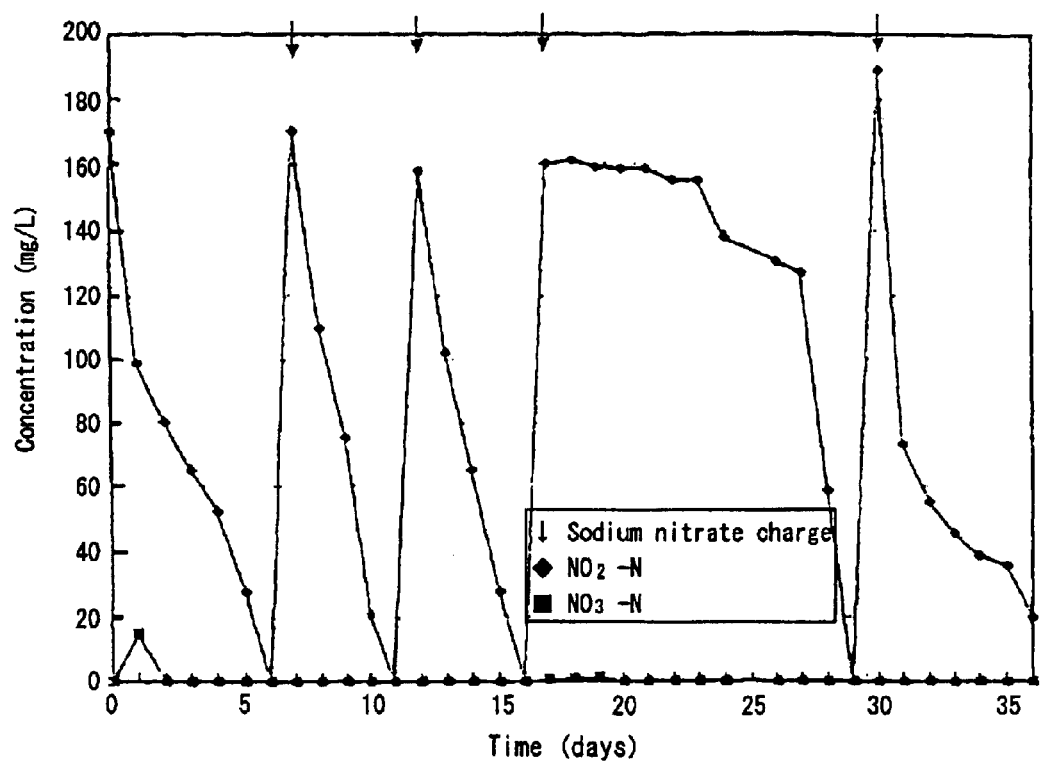
FIG. 2 is a graph that shows the result of denitrification by the method of the present invention.

In FIG. 2, test results of the denitrification by repeated batch method in relation to time are shown. Arrows in the figure indicate charging of new sodium nitrate. Changes in $NO_3$ nitrogen and $NO_2$ nitrogen are shown.

In FIG. 2, decrease of nitric acid is not observed after the addition on the 17th day (day 17 to 23); this is due to the complete consumption of the starch carrier that was added at the beginning of the experiment. When a new starch carrier was charged on the 23rd day, denitrification was resumed.

Further, as shown in FIG. 2, it was confirmed that 170 ppm of nitrate nitrogen could be completely removed without the accumulation of nitrous acid, at a low temperature of 15° C. within 4 to 5 days. Further, it was shown that long-term denitrification could be made possible by supplying the consumed carrier.

It was also confirmed that denitrificans 2 and 3 could each remove 40 and 150 ppm of nitrate nitrogen completely, within 4 to 5 days at a low temperature of 15° C. without accumulating nitrous acid, and results similar to those described above were obtained.

INDUSTRIAL APPLICABILITY

As has been described above in detail, in the invention of the present application, by immobilizing denitrificans that grow using starch as its single carbon source onto an inexpensive starch-derived biodegradable plastic, the denitrificans are in constant contact with the carbon source, and efficient utilization of the carbon source and high concentration of the denitrificans is made possible. By using starch as the carbon source, there is no concern for toxicity as in the case for methanol.

Accordingly, by the present invention, an economic and efficient method for direct purification of nitrate-polluted groundwater, which is also worry-free in terms of toxicity, is provided.

What is claimed is:

1. A method for direct purification of nitrate-polluted groundwater, which comprises contacting nitrate-polluted groundwater with a carrier to which denitrificans are immobilized, wherein the carrier consists of a starch-derived biodegradable plastic that acts as a single carbon source for the denitrificans, the denitrificans show denitrification effect at temperatures of 20° C. or lower and do not require heavy metals or accumulate nitrous acid, and contacting with water occurs by installing the carrier in a net case, and shaking the case vertically.

2. The method for direct purification of nitrate-polluted groundwater of claim 1, wherein the starch-derived biodegradable plastic contains 60 wt % or more of starch.

3. The method for direct purification of nitrate-polluted groundwater of claim 1, wherein the starch-derived biodegradable plastic is porous.

4. The method for direct purification of nitrate-polluted groundwater of claim 3, wherein the starch-derived biodegradable plastic has a porosity of 10% or more.

5. The method for direct purification of nitrate-polluted groundwater of claim 1, wherein the starch-derived biodegradable plastic has a low solubility to water.

6. The method for direct purification of nitrate-polluted groundwater of claim 1, wherein the starch-derived biodegradable plastic is recycled from waste.

7. The method for direct purification of nitrate-polluted groundwater of claim 2, wherein the starch-derived biodegradable plastic is porous.

8. The method for direct purification of nitrate-polluted groundwater of claim 2, wherein the starch-derived biodegradable plastic has a low solubility to water.

9. The method for direct purification of nitrate-polluted groundwater of claim 3, wherein the starch-derived biodegradable plastic has a low solubility to water.

10. The method for direct purification of nitrate-polluted groundwater of claim 4, wherein the starch-derived biodegradable plastic has a low solubility to water.

11. The method for direct purification of nitrate-polluted groundwater of claim 2, wherein the starch-derived biodegradable plastic is recycled from waste.

12. The method for direct purification of nitrate-polluted groundwater of claim 3, wherein the starch-derived biodegradable plastic is recycled from waste.

13. The method for direct purification of nitrate-polluted groundwater of claim 4, wherein the starch-derived biodegradable plastic is recycled from waste.

14. The method for direct purification of nitrate-polluted groundwater of claim 5, wherein the starch-derived biodegradable plastic is recycled from waste.

* * * * *